United States Patent [19]

Albrecht

[11] Patent Number: 5,616,245
[45] Date of Patent: Apr. 1, 1997

[54] HIGH GRAVITY SEPARATOR

[75] Inventor: Michael C. Albrecht, Concord, Calif.

[73] Assignee: HJS Clem AG, Liechtenstein, Germany

[21] Appl. No.: 444,800

[22] Filed: May 19, 1995

Related U.S. Application Data

[63] Continuation-in-part of Ser. No. 255,030, Jun. 7, 1994, abandoned.
[51] Int. Cl.$^6$ ................................. B04B 3/00; B04B 3/06
[52] U.S. Cl. ......................... 210/371; 210/377; 210/378; 210/380.1; 210/380.3; 210/388; 210/391; 209/44; 209/444; 494/27; 494/36; 494/60
[58] Field of Search ................................. 210/360.1, 369, 210/370, 371, 377, 378, 380.1, 380.3; 209/44, 423, 425, 449, 500; 494/4, 30, 36, 60

[56] References Cited

U.S. PATENT DOCUMENTS

| | | | |
|---|---|---|---|
| 2,750,040 | 6/1956 | Strich | 210/371 |
| 3,377,019 | 4/1968 | Cox | 210/380.3 |
| 3,488,691 | 1/1970 | Grimwood | 210/380.3 |

*Primary Examiner*—David A. Reifsnyder
*Attorney, Agent, or Firm*—Townsend and Townsend and Crew LLP

[57] ABSTRACT

A separator includes a housing, a basket rotatably mounted in the housing and a movable weir member. The basket has an upstream end portion, a downstream end portion and an intermediate tubular portion that includes or forms a screen deck. The weir member is movable between a first position where a portion of the weir member extends radially inward relative to the inner surface of the downstream open end portion and a second position spaced from the first position. In this manner, the weir member forms a movable dam adjacent the downstream end portion of the basket. In operation, feed material is fed into the basket as the basket is rotated. The heavy fractions of the material pass transversely through the basket (i.e., the tubular portion that forms a screen deck) and report to a first outlet from which the heavy fractions are collected. The weir member position is adjusted so that the intermediate weight fractions are intermittently or continuously channeled from the downstream portion of the basket to a second outlet, while the light fractions flow over the weir gate and through a third outlet. The intermediate layer advantageously forms a barrier that impedes the transverse flow of the lighter fractions through the basket with the heavy fractions. When separating solid materials, the basket preferably is vibrated to enhance stratification of the feed.

14 Claims, 6 Drawing Sheets

HIGH GRAVITY SEPARATOR

This application is a continuation-in-part of application Ser. No. 08/255,030, filed Jun. 7, 1994, presently abandoned.

The present invention relates to separators generally, and more particularly to separators that utilize centrifugal force to enhance separation of heavy and light fractions of materials.

BACKGROUND OF THE INVENTION

Jigging is a well-known process that is used to separate a material into various fractions. For example, jigging is commonly used in mineral processing and coal preparation to separate two or more mineral species from a material based on specific gravity. Generally, jigging involves particle stratification wherein the particles of a material are rearranged through alternate expansion and compaction of a fluidized bed of those particles by pulsating fluid flow that is periodically reversed. The continuously varying forces acting on the particles stratify the material into layers of particles that are arranged by increasing density from top to bottom. That is, the bed expansion and compaction effect the separation. The expansion or opening of the bed permits the particles to move away from each other. Then, during compaction or closing of the bed, hindered settling, differential acceleration and consolidation trickling cause the material to separate into layers of particles differing in specific gravity.

Stratification is generally carried out in a jig. Early jigs used a basket loaded with mixed particles that were moved up and down (jigged) in a tank of water. This agitation rearranged the particles in layers of increasing density from top to bottom. Although these jigs stratified the feed material intended to be separated, advances in jig technology were made so that a wider range of materials could be separated and higher throughput achieved.

The most common type of jig today is the fixed or flat bed jig. In a flat bed jig, a flat perforated screen plate (screen deck) supports the feed or material to be separated. A hutch compartment, from which water is pulsed to and from the bed of material supported on the screen to oscillate the particles and effect bed expansion and contraction, is formed below the screen. The water pulsations can be motivated by various means such as air pressure or piston-like plungers. The upward movement of the water through the perforated screen plate from air pressure or plunger-activated water pressure, for example, is referred to as the "pulsation" stroke, while the downward movement is termed the "suction" stroke. As the feed moves across the screen, the fraction of the feed which has a larger specific gravity and forms the bottom layer is typically removed by allowing it to simply pass through the screen. The lighter fraction flows off the downstream end of the screen deck. For a more detailed description of this process, see, for example, Leonard, III, J. W., Ed., *Coal Preparation,* Society for Mining, Metallurgy and Exploration, Inc., Littleton, Colo. (1991).

Centrifugal jigs were developed to amplify the gravitational forces acting on the feed and thus improve particle stratification. In centrifugal jigs, the screen is wrapped into a cylindrical configuration. The feed is introduced to a rotating plate which propels the feed to the cylindrical screen which is rotated about a vertical axis. A hutch is provided around the screen so that water can be pulsed through the screen and, thus, the feed material. As the feed material flows downward along the screen, the water pulsations effect bed expansion and compaction. The heavy fractions flow through the screen to a first collection zone, while the lighter fractions continue to flow downward to a different collection zone. The feed, which can be held against the inner surface of the screen by centrifugal force, can be periodically jigged by fluid pulses created by the interaction of a series of equi-angularly spaced fluid supply nozzles and a series of water pulse blocks leading to the hutch interior.

In order to improve the ability of jigs to handle particles having very fine sizes, the jigs described above have been provided with a bed of "ragging". The ragging, which typically comprises steel shot, is provided over the screen and permits the transverse passage of heavier particles, but impedes the flow of lighter or fine particles. In this manner, the ragging reduces the amount of light fractions that pass through the screen with the heavier fractions. However, among the drawbacks of using ragging beds is that they must be periodically cleaned so that the jig can operate efficiently. Otherwise, materials trapped in the ragging can undesirably impede the water pulsations, as well as heavy particle flow to the screen.

The expansion and compaction systems described above also are not without limitation. Generally, it is desirable to have each expansion-compaction cycle (jig cycle) repeat at a high frequency in order to effectively separate the heavy and light fractions. This is especially the case when processing extremely fine particles and/or using a centrifugal jig where the time in which the feed travels along the screen is relatively short. However, it is difficult to obtain a high pulse frequency with a water pulsing system due to a number of factors such as the fluidity of the water. That is, it is difficult to impart a tight pulsation or suction stroke to a fluid. In addition, the pulsing systems typically involve complex mechanical components including complex valving arrangements, diaphragms and so forth.

The effectiveness of jigging also is highly dependent upon the difference in specific gravity of the materials being separated. When the specific gravities are not very different, conventional jigs may not provide adequate separation.

SUMMARY OF THE INVENTION

The present invention is directed to a separator that avoids the problems and disadvantages of the prior art. The invention accomplishes this goal by providing a separator including a housing, a basket rotatably mounted in the housing and a movable weir member.

The basket has a closed upstream portion, a downstream open portion and an intermediate tubular portion comprising a screen or screen deck. A drive is coupled to the basket for rotating the basket in the housing.

The screen or screen deck of the basket is formed with sized openings. Material finer than the sized openings can pass through the side walls of the basket; material larger than the sized openings cannot pass through the side walls of the basket. This material larger than the sized openings must pass from the inlet of the basket to the outlet of the basket.

The separator also includes a feed line having an inlet adapted for coupling to a source of feed material. This feed line outlets to the inlet of the basket and delivers feed material to the rotating basket.

The weir member includes a circular dam which can move to and from a flow blocking relationship at the outlet end of the basket. When the weir blocks the outlet end of the basket, material confined within the basket can only flow over the top of the weir; no material can flow between the weir and basket. When the weir is spaced apart from the outlet end of the basket, material within the basket can flow either over the top of the weir or between the weir and basket. In this manner, the weir member forms a movable dam adjacent the downstream open-end portion of the basket which can distribute flow between a flow over the top of the weir and a flow between the weir and basket. As will hereafter appear, the flow is adjusted dependent upon water and material flow in the rotating basket.

There are two inlets to the separator; the first inlet is for material, the second inlet is for water.

The first material inlet places feed material in the upstream portion of the basket. The basket is frustum shaped with the inlet adjacent the apex end of the frustum, and the outlet and weir adjacent the base end of the frustum. The basket spins about a horizontal axis so that materials confined within the basket naturally tend to flow from the inlet of the basket to the outlet of the basket and weir. Typically the sidewalls of the basket have about a slope with respect to the spin axis of the basket. The slope is determined by desired throughput and material flow characteristics. For example, utilizing said water slurry, 5° has been utilized.

The second inlet introduces water into the hutch on the outside of the basket. The basket rotates within a water tight housing or hutch; the basket rotates the water within the water tight housing to rotate the surrounding water on the outside of the basket.

During spinning operation of the basket, water rotating and following the basket flows through the basket. This flow occurs from the outside of the basket into the inside of the basket. The water after flowing to the inside of the basket exits the basket. This exit from the basket occurs either over the weir or alternatively between the weir and basket end when the weir moves to define an opening at the exit end of the basket.

Finally, the rotating basket is vibrated. Typically, vibrations are positioned to lie as close as possible to the horizontal center of mass of the separator and vibrate the separator normal to the spin axis. When the vibrator vibrates, the rotating basket likewise vibrates. These vibrations when superimposed upon the basket material flow and basket water flow do not act to transport the flowing particles; the vibrations normal to the spin axis act to separate the flowing particles.

The vibrations are generally normal to the basket screen. These normal vibrations produce a unique combination of separating forces. These forces are independently discussed hereafter; the reader is reminded that the forces act together.

First, and most obviously, forces attendant to flowthrough centrifugation are present. Specifically, gravity fields in the range from 50 to 150 gravity fields are produced. Heavy particles flowing through the basket, and all particles flowing along the basket are subjected to these centrifugal gravity fields.

It should be understood that the gravity field optimum to separation can be controlled by controlling the speed of rotation of the basket. Further, such gravities of separation will be a function of the diameter of the basket. Regardless of the diameter, it is sufficient of the centrifugal speed is between 3,000 to 6,500 ft/min centripetal speed.

Second, all particles being separated are buoyantly supported by the water. Ratios of density are increased by this buoyant support. This increase in the ratios of density can be readily understood by considering a specific example.

Taking the problem of the separation of coal (1.3–1.6 specific gravity) from (2.1–2.5 specific gravity) shale, slate, rock, and ash, it can readily be determined that the ratio of the heavy specific gravities to the light specific gravities is about (2.3/1.4) or about 1.64 when the materials are dry. Suspend the same materials in water, and the ratio changes. Specifically, and subtracting the specific gravity of the buoyant support of water, one gets a ratio for separation of (1.3/0.4) or 3.25. This enhanced ratio favors separation occurring more readily in the buoyantly supported environment.

Third, the water flow in passing up through the particles, subjects the particles to the forces of elutriation. Water flows upwardly. The particles try to move downward. The heavy particles move down faster against the water flow; the light particles move down more slowly against the water flow. A separation results tending to move the heavy particles to the bottom and the light particles to the top.

The vibrations superimposed on this water flow produces three additional effects. Taking the case of a single vibration normal to the spin axis of the basket, these effects can be separately described as differential acceleration, hindered settling, and consolidation trickling.

In differential acceleration, acceleration occurs dependent upon particle size and density. Large heavy particles move first; small heavy particles move second. Large light particles move third and small light particles move forth. Every time the basket vibrates normal to the spin axis of the basket, such particle movement occurs. After such particle movement occurs, the particles must settle.

Hindered settling results. Large heavy particles force their way to the bottom of the settling particles. Small heavy particles force themselves on top of the large heavy particles. Finally, large light particles form with small light particles on the top. This process continues until the vibrated bed comes to rest.

When the bed comes to rest, consolidation trickling occurs. Small particles naturally work their way between the large particles in the gaps between the large particles. The bed comes to rest—until the next vibration (immediately) occurs.

It will be remembered that heavy particles having a size too large to pass through the basket deck are required to flow along the basket deck from the inlet of the basket to the outlet of the basket adjacent the weir. The flow of large heavy particles forms a "ragging" on and over the rotating surface of the basket. Particles flowing from the basket inlet to the basket outlet must pass through this bed of "ragging" particles. Heavy particles traverse this ragging rapidly; light particles are retarded. Further particle separation results.

In the disclosed separator, the seven enumerated effects act in concert to effect separation. Centrifugation, buoyant support, elutriation, differential acceleration, hindered settling, consolidation trickling and ragging separation all simultaneously occur. Rapid stratification of materials to be separated follows.

The reader will note that various of the above separation effects are present—more or less—in separation devices of the prior art. However, no known device has combined all these effects for simultaneous concentration within a flowthrough centrifugal separator.

In operation, the separator divides the feed material into three different material flows based on size and specific gravity. The heavy fractions of the material having a size sufficient small to pass through the screen or screen deck of the basket pass transversely through the basket (i.e., the tubular portion that comprises a screen and forms a screen deck) from the inside of the basket to the outside of the basket. These materials pass interior of the housing, settle through the rotating water, and report to a first outlet from which the heavy fractions are collected. This first outlet drains the heavy and small basket passed fractions along with some water from the interior of the housing.

The weir member position is adjusted dependent upon the separation desired. Heavy fractions having a size too large to pass through the basket are channeled to the weir together with all other fractions of material. When the weir is open, these heavy fractions and the intermediate fractions or the fractions of the material having a specific gravity generally between the heavy and light fractions are intermittently or continuously channeled from the downstream portion of the basket through the weir. When the materials pass through the weir they pass to a second outlet for collection.

The light fractions flow over the weir member and through a third outlet from which they can be collected.

The reader must further understand that the flow at all three outlets is interdependently controlled. That is to say that the input of material, and the input of water must be dynamically balanced with the output passing through the basket walls, the output between the weir and basket, and the output over the weir. Some discussion of the balancing of these inflows and outflows can be advantageous.

Take the case of the previous example related to the separation of coal from shale, slate, rock, and/or ash. In any specific separation environment found in nature, the desired coal will typically be present in a more or less constant fraction. For example, coal can constitute 21% of a tailings mixture at a specific site. Further, it will be noted that coal is the fraction having the lowest specific density. This being the case, coal will pass over the weir in the separator; shale, slate, rock and ash will either pass through the basket or between the weir and basket outlet.

In this example of separation, it is important to note that the operator of the separator, by watching the mixture outflow over the weir (the third flow path), can effectively "tune" the two rates of input, and the three outputs so that a substantially pure fraction of coal only passes over the weir! This ability to "tune" the inflows and outflows of the separator to almost any ratio of specific gravities and any proportion of desired or undesired constituents for separation gives the disclosed separator and its process of separation wide applicability.

It will further be understood that the flowthrough centrifugal separator of this invention includes the ability to adjust the back pressure on the flow paths. For example, the back pressure on the flowthrough the basket is adjusted by closing of an outlet valve on the housing. Further, adjustment of the weir adjusts the back pressure on material flowing along the basket from the inlet to the outlet of the basket.

It will further be understood that separation of either two or three fractions can occur. Further, and as is well known, the separators can be placed in series. It will be appreciated that the separator of this invention has vastly improved through put and separation capability. Accordingly, two of the separators working in series can out perform by a large margin serial separation combinations of the prior art.

The intermediate layer advantageously forms a barrier that impedes the transverse flow of the lighter fractions through the basket with the heavy fractions. Thus, the separator of the present invention eliminates the need for providing a bed of ragging material. In addition, the present invention provides a significant increase in throughput compared to known separating methods. The separator can process over 100 tons/hour depending on the type of feed and has very small space requirements relative to its output capacity. The separator of the present invention also can separate very fine particles, such as particles in the 1–2 µ size range, as well as separate materials comprising very fine particles which have relatively close specific gravities. For example, the separator of the present invention can separate particles differing by only 0.5 in their specific gravities when the particles are as small as 1 µ in size. Of course, larger particles which differ in specific gravity by as little as 0.5 also can be separated.

To enhance stratification of the feed, the particles are oscillated by vibrating the basket. According to the preferred embodiment, a vibrating mechanism vibrates the basket, thereby oscillating the feed particles. In this manner, very high jig frequencies can be achieved and precisely controlled as compared to the conventional complex fluid motivated pulsation systems discussed above. In the preferred embodiment, the vibrating mechanism includes an enclosure coupled to the housing. Eccentric weights are supported by the enclosure and rotated to produce vibrations which are transferred to the housing, to the drive shaft for the basket and to the basket.

In a first embodiment of the present invention, a water supply line(s) is coupled to the separator to deliver water to the hutch that is formed between the basket and the separator housing. The hutch is kept filled by balancing the volumes of incoming feed or slurry and water supplied to the hutch via the water supply line(s) with the volume of fluid discharged through the first, second and third outlets so that a generally large amount of the water flows over the weir member with the light fractions. That is, the water level in the hutch is dependent on the flow rate of the water and feed material.

In order to enhance the water level control, the first outlet, which is fluidly coupled to the hutch, is provided with a control valve for controlling the flow rate therethrough. In addition, a seal is provided to fluidly seal the hutch from the second outlet to facilitate control of the hutch fluid and ensure that the material flows into the first and second outlets do not mix downstream from the basket. In the preferred embodiment, the seal includes a sealing surface attached to the screen and oriented perpendicular to the axis of rotation of the screen. An elastomeric ring is attached to the housing and positioned against the sealing surface. During operation, the water pressure in the hutch advantageously forces the elastomeric ring against the sealing surface, thereby fluidly separating the hutch from the fluid path of the intermediate particles as those particles travel from between the downstream open-end portion of the basket and the weir member and the second outlet.

In a further embodiment of the present invention, an enclosure having a plurality of discharge nozzles or openings is mounted to the basket so that the hutch is formed as an integral part of the basket. Thus, the seal discussed above with respect to the first embodiment is not necessary. Thus, this configuration permits sharper and cleaner separations with less chance of recontamination of the products since seal leakage is not possible and can be used to separate solid/liquid suspensions as well as liquid/liquid suspensions. In addition, this embodiment does not require a separate hutch water supply.

The integral hutch and basket configuration is especially advantageous when processing in a liquid/liquid mode, such as when processing coal slurry fuels, crude oils, environmental remediation and clean-up, toxic liquids or colloidal suspensions. The heavy liquid(s) passes through the enclosure nozzles at a controlled rate determined by the rotational speed of the basket and the size of the nozzles, both of which are selected according to the application. In this manner, the heavy liquid(s) is withdrawn at a controlled rate allowing for complete disengagement of the light and heavy phases. The weir member is positioned to permit the light liquid phases to pass there over, while allowing solids present in the liquids together with some of the light liquid(s) to be withdrawn between the weir member and the downstream open-end portion of the basket. In contrast to the present invention, centrifugal jigs generally are incapable of effectively separating the heavy liquid(s) from solids that may be present in the feed, which, in turn, leads to the problem of the solids plugging the heavy liquid(s) discharge openings.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figures 1, 2:
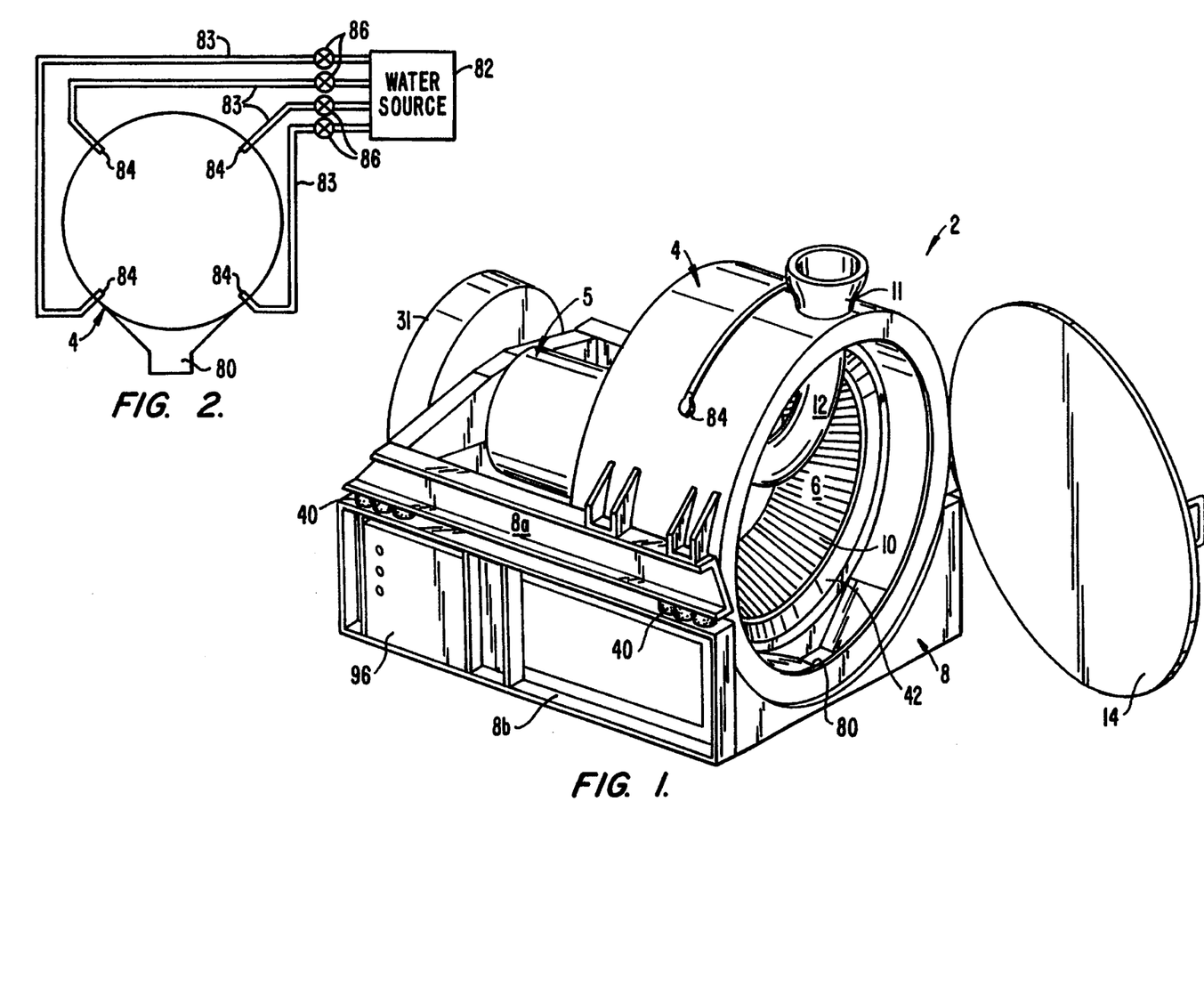
FIG. 1 is a perspective view of a separator constructed in accordance with the principles of the present invention.
FIG. 2 is a diagrammatic view of the hutch water delivery system for the separator of FIG. 1.

Referring to the drawings in detail wherein like numerals represent like elements, a high gravity separator 2 is shown according to the principles of the present invention. Referring to FIG. 1, Separator 2 generally includes a generally cylindrical housing or shell 4 that forms processing chamber 6, a filtering basket 10 rotatably mounted in the housing chamber, a vibrating assembly 5 for vibrating basket 10, and a weir member 42 axially movable toward and away from the downstream end of filtering basket 10 to form an outlet for intermediate specific weight material that is present in the feed.

Figure 3:
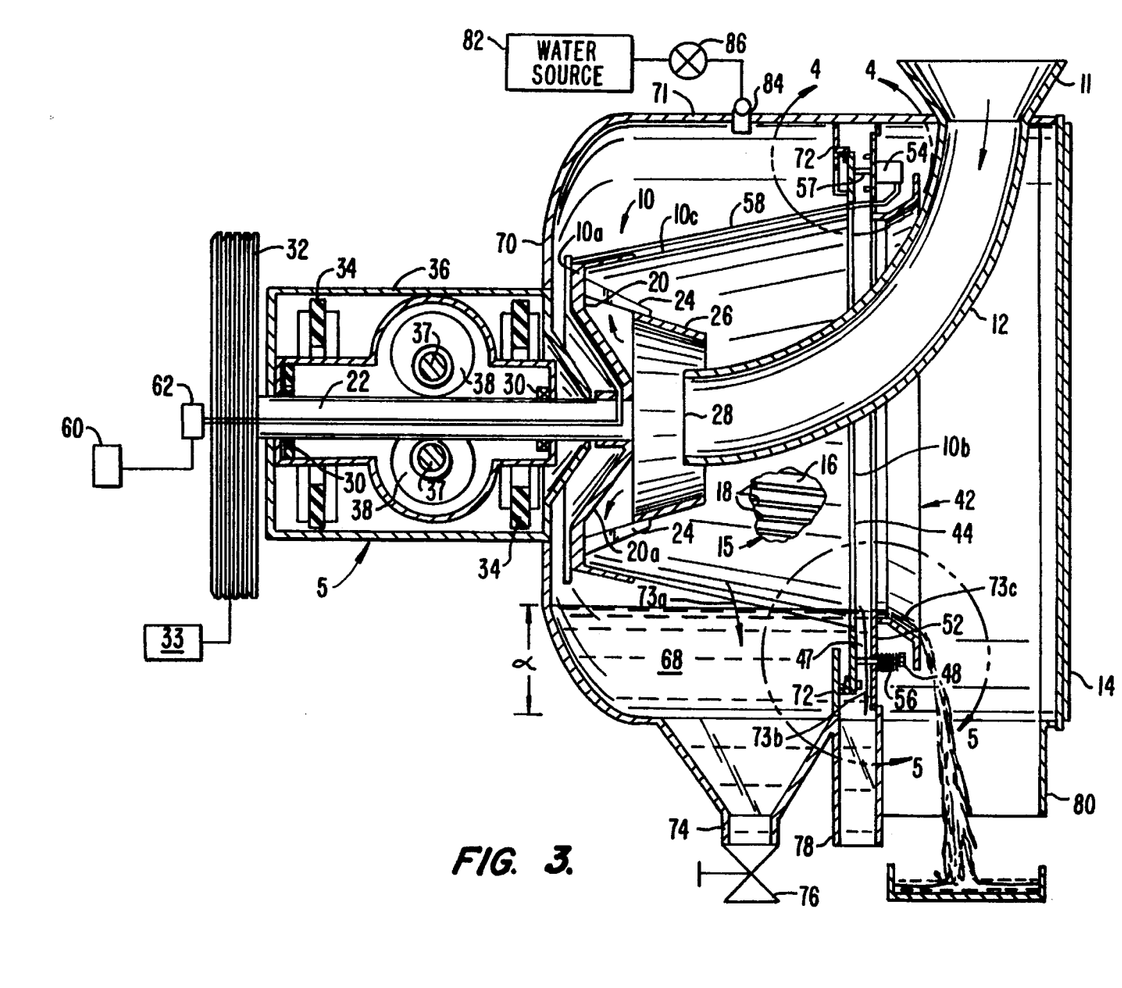
FIG. 3 is a longitudinal section of the separator of FIG. 1 showing the weir member in an open position.

Referring to FIGS. 1 and 3, housing or shell 4 generally comprises a closed end wall portion 70, a cylindrical wall portion 71 and an annular wall portion 72 that extends radially inward from wall portion 71. End wall portion 70, annular wall portion 72 and the portion of cylindrical wall portion 71 between wall portions 70 and 72 form hutch 68 for holding hutch water as will be described in more detail below. Door 14 is hinge coupled to the downstream open end portion of housing 4 to provide access to chamber 6. A seal (not shown) is provided between the door and the housing to provide a fluid tight closure. Housing 4 further includes first, second and third outlets 74, 78 and 80, respectively, for discharging the heavy, intermediate and light fractions separated by separator 2. The first or hutch outlet 74 preferably is provided with an adjustable control valve 76 for controlling the flow rate therethrough as will be described in more detail below. A feed pipe 12 extends through housing 4 for delivering a feed material from a source (not shown) to filtering basket 10. Feed pipe 12 includes an inlet 11 adapted for coupling to a line (not shown) that is coupled to the feed source and an outlet 28 for discharging the feed into basket 10. Outlet 28 preferably is positioned concentrically within basket 10 and in the vicinity of the upstream portion thereof.

With reference to FIG. 3, basket 10 has an upstream end portion 10a, a downstream end portion 10b and an intermediate tubular portion 10c. Intermediate portion 10c forms a tubular screen deck for the feed and in the preferred embodiment comprises a plurality of rods 16 that extend essentially the entire length of basket 10, are bound together to form a 360° pattern and are circumferentially spaced to form generally parallel openings or slots 18 therebetween as shown in enlarged section 15 of FIG. 3. In the preferred embodiment, a single layer of rods are used to form intermediate portion 10c such that each rod has a surface that forms a portion of the inner surface of basket 10 and another surface that forms the outer surface of the basket. Rods 16 preferably are of a corrosion resistant material such as stainless steel and can be selected to have a 3/16-inch diameter and spaced to form 1 mm slots therebetween, for example. In the preferred embodiment, rods 16 are arranged so that basket 10 has a frustum shape as shown in FIG. 3 to enhance the flow of feed material from upstream end portion 10a to downstream end portion 10b. This configuration also advantageously causes the forces acting on the feed during rotation to increase as the feed descends along the basket since the peripheral speed of the basket progressively increases in the downstream direction. One suitable basket is commercially available from Bixby-Zimmer, Inc., Illinois under part no. 64627-1. Although a particular basket configuration has been described, other configurations can be used. For example, rods 16 can be selected from a wide range of materials and sizes and arranged to form a wide range of slot or opening configurations and sizes depending on the material to be separated. Alternatively, the screen deck or intermediate portion 10c can be formed from any porous or perforated structure and may comprise woven wire, for example, and can have other shapes such as cylindrical or parabolic shapes.

Although the downstream end portion 10b of basket 10 is shown comprising annular rim 45 and annular flange 50 secured thereto and extending therefrom, these elements can be formed as a single piece. The upstream end portion 10a of basket 10 comprises baseplate 20, which includes a hole formed therein for receiving drive shaft 22. Baseplate 20 is secured to shaft 22 for rotation therewith and is secured to the baseplate to form a fluid tight joint so that liquid cannot pass therebetween. The remaining portion of baseplate 20 preferably is imperforate so that material cannot pass therethrough. A plurality of brackets 24 are circumferentially spaced along the inner surface of baseplate 20 and attached thereto. Two of these brackets are shown in FIG. 3. The proximal end portions of brackets 24 are secured to frustum shaped distribution sleeve 26. Thus, the selection of the number of brackets can vary based on the size of sleeve 26. Baseplate 20 also has a conical portion 20*a* for directing feed material radially outward. As basket 10 is rotated and feed discharged from pipe outlet 28, distribution sleeve 26 directs the material toward conical portion 20*a* of baseplate 20 which distributes the material radially outward toward intermediate portion 10*c* of basket 10.

Drive shaft 22 is rotatably supported by bearings 30. The end of shaft 22 opposite baseplate 20 is connected to sheave 32 for rotation therewith. Sheave 32 is covered by shroud 31 (FIG. 1) and is driven by a motor, which is diagrammatically shown and designated with reference numeral 33 in FIG. 3, by a plurality of belts as would be apparent to one of ordinary skill. It should be understood, however, that other systems can be used to rotate shaft 22, but should be capable of rotating basket 10 from about 3,000 to 6,500 ft/min centripical speed, which is the general operating range. The particular speed depends on the material to be separated.

Vibrating assembly 5 is provided to vibrate basket 10 and enhance stratification of the particles in the feed as the feed descends downstream along the inner wall of basket 10. Vibrating assembly 5 includes casing or enclosure 36 which is supported by frame 8 as is sheave 32 and housing 4. Vibrating assembly 5 is of conventional construction and includes an outer wall or casing 35 which is mounted within enclosure 36 and houses bearings 30. Drive shafts 37 are coupled to eccentric weights 38 which are rotatably supported by outer wall or casing 35. A drive unit (not shown) is provided for rotating shafts 37. Rotation of shafts 37 rotates eccentric weights 38, thereby inducing vibrations which travel through shafts 37, outer wall 35, bearings 30, shaft 22 and ultimately to basket 10. Vibration dampeners 34 reduce vibration transfer from outer wall or casing 35 to the enclosure 36 and frame 8. Vibration dampeners 40 also are positioned between upper and lower sections 8*a* and 8*b* of frame 8 to minimize the transfer of vibrations to the building foundation on which the separator is located, for example. The vibrating mechanism preferably should generate vibrations in a frequency range of about 5 to 40 hz to provide the desired effect on the range of materials that may be processed with separator 2.

Although vibrating assembly 5 is shown mounted around shaft 22, it can be mounted to any other part of separator 2 so long as it sufficiently vibrates basket 10. In addition, basket 10 can be vibrated with other mechanisms as would be apparent to one of ordinary skill in the art. Examples of alternative vibrating assemblies include electromagnetic, electro-mechanical and air vibrators. A manufacturer of such electromagnetic vibrating assemblies is Vibranetics, a division of Carrier Vibrating Equipment, Inc., Kentucky. As of the filing of this second U.S. patent application, I am using two electromagnetic vibrators mounted parallel to the shaft to maintain vibration normal to the spin axis of the separator.

Figure 4:
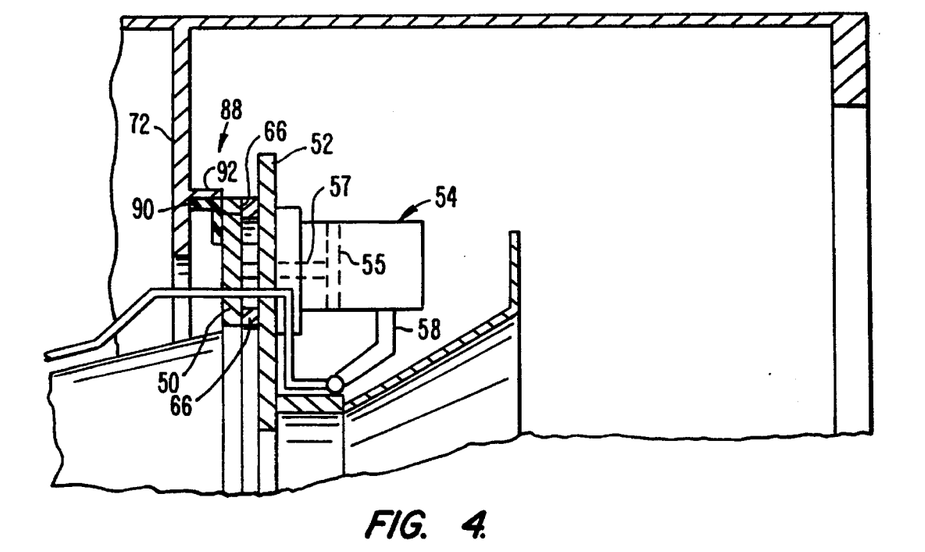
FIG. 4 is an enlarged view of the area within line 4—4 of FIG. 3 showing the weir member in the closed position.
Figure 5:
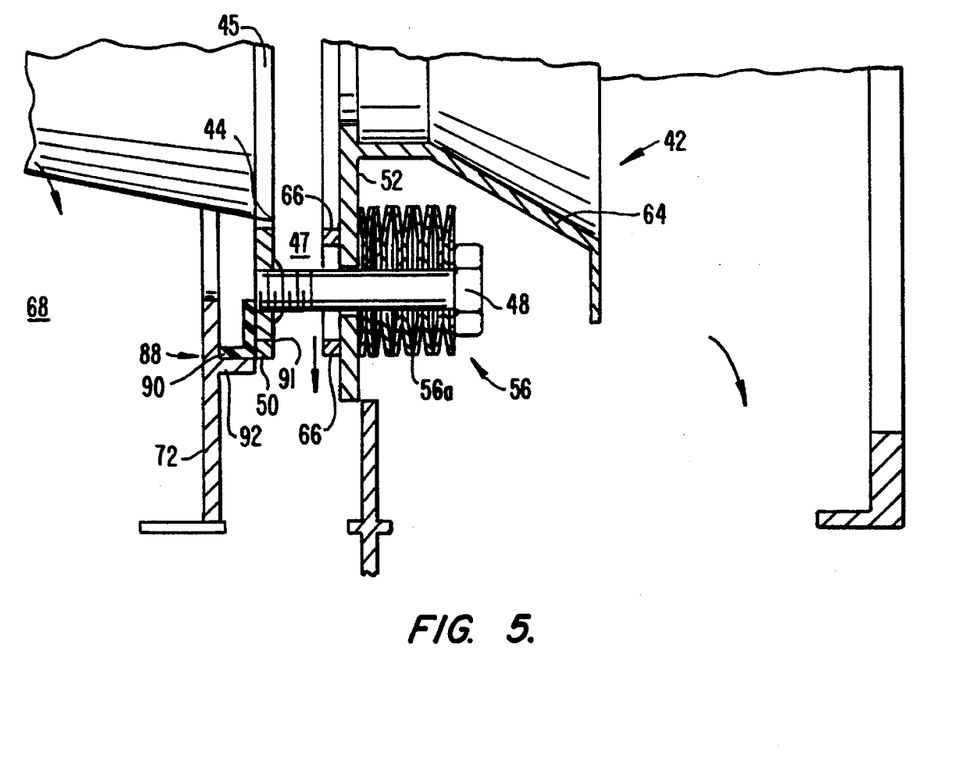
FIG. 5 is an enlarged view of the area within line 5—5 of FIG. 3 showing the weir member in the open position.

Referring to FIGS. 3–5, weir member 42 is provided to form a movable dam adjacent the downstream open end portion 10*b* of basket 10 so that the intermediate fractions can be separated from the lighter fractions before the lighter fractions exit basket 10. In the preferred embodiment, weir member 42 is generally ring-shaped and comprises an annular plate portion 52 and a curved portion 64 that depends from the upper or inner portion of annular plate portion 52 and forms a splash guard for the actuators and biasing mechanisms which will be discussed in detail below.

Annular plate portion 52 includes a plurality of circumferentially spaced holes for slidably receiving studs 48 which are secured to circumferentially spaced positions around annular flange 50 of basket 10. In this manner, weir member 42 is axially movable toward and away from the downstream inner peripheral edge 44 of basket 10 from which the remainder of material in the feed. Studs 48, which can be bolts, for example, can be welded to flange 50 to provide a fluid-tight connection therebetween. A pair of annular rings or spacers 66 are secured to the inner face of annular plate portion 52 to reduce the contact area between annular plate portion 52 and flange 50 when weir member 42 is moved to a closed position. This reduces the force necessary to move weir member 42 from a closed to an open position. Spacers 66 also are configured to prevent material from flowing through channel 47 and to outlet 78 when weir member 42 is in the closed position.

Referring to FIGS. 3–5, weir member 42 is movable between a closed position, where continuous, annular spacer rings 66 abut against the generally flat outer surface of flange 50 so that material cannot pass between weir member 42 and downstream edge 44 of basket 10, to an open position where spacers 66 are spaced from basket 10. FIG. 4 shows the weir member 42 in a closed position where a portion of annular plate portion 52 extends radially inward relative to the inner surface of downstream portion 10*b* or radially inward relative to the downstream inner peripheral edge 44 of basket rim 45 so as to form a dam for slurry descending along the inner surface of basket 10. FIG. 5 shows the weir member 42 in the open position where annular spacers 66 and weir member 42 are spaced from basket rim 45 such that channel or fluid path 47 is formed between a portion of weir member portion 52 and the wall formed by rim 45 and flange 50. Channel 47 is fluidly coupled to second outlet 78. Thus, weir member 42 acts as a gate or control valve for second outlet 78.

The position of weir member 42 is controlled by a plurality of actuators 54 and spring assemblies or actuators 56. Although one actuator 54 and spring assembly 56 is shown in the drawings, a plurality of these actuators and spring assemblies are circumferentially and equidistantly spaced around annular plate portion 52 and secured thereto. In the preferred embodiment, each actuator 54 is a hydraulic actuator of conventional design. Each actuator 54 includes a piston 55 and piston rod 57 shown in phantom in FIG. 4. When actuator 54 is energized, rod 57, which extends through a respective hole in annular plate portion 52 presses against flange 50 and urges weir member 42 away from basket 10 in an axial direction (FIG. 3). Hydraulic feed line 58 provides hydraulic fluid to actuators 54. One end of line 58 is fluidly coupled to the cylinders of actuators 54 to move pistons 55 as is conventional in the art. The other end of line 58 is coupled to a conventional rotary coupling 62 which, in turn, is coupled to hydraulic fluid source 60. A solenoid control system can be provided to control delivery of the hydraulic fluid to actuators 54. Although a particular actuator has been described, other actuators such as pneumatic actuators as well as other mechanisms to move weir member 42 away from basket 10 can be used. Each spring assembly 56 generally includes a compression spring 56*a* and stud 48. Springs 56*a* provided around each stud 48 and arranged as shown in the drawings to bias annular plate portion 52 of weir member 42 toward basket 10. Thus, by controlling the pressure in actuators 54, the space between basket 10 and weir member 42 can be adjusted. The number of actuators 54 and spring assemblies 56 depends on the size of the separator as would be apparent to one of ordinary skill in the art.

For example, when using a 42-inch separator, as measured by the inside diameter of the basket at the discharge end, it is preferred to use four actuators 54 and eight springs 56.

Referring to FIG. 2, a water delivery system for providing hutch water to main hutch 68, is diagrammatically shown. As shown in FIG. 2, the hutch water delivery system includes pressurized water source 82 and four lines 83 that fluidly couple water source 82 to housing chamber 6. More specifically, the downstream end of each line 83 is provided with a nozzle 84. Nozzles 84 are arranged so that their outlets are equidistantly spaced along the inner circumference of housing 4. Each water feed line also is provided with a control valve 86 for controlling the amount of water delivered to hutch 68. Although a particular water delivery system has been described, other systems can be used as would be apparent to one of ordinary skill. For example, a single control valve can replace valves 86.

Seal 88 is provided to prevent water from hutch 68 from passing over housing wall 72, which is positioned radially outward from basket 10, and into second outlet 78. Seal 88 includes generally annular elastomeric member 90, which has an L-shaped cross-section, and annular support ring 92, which extends from wall 72. One leg of elastomeric member 92 is positioned against the adjacent or sealing surface 91 of flange 50, while the other leg of member 92 is secured to ring 92 by fasteners (not shown), for example. Water pressure developed in hutch 68 forces the elastomeric member 90 into sealing contact with sealing surface 91.

In operation, weir member 42 is positioned in the closed position as shown in FIG. 4. Hutch 68 is filled with water from source 82 such that a small amount of water flows over weir member 42. As basket 10 is rotated and vibrated, feed material having light and heavy fractions is fed through the feed pipe 12 in the form of a slurry containing up to 95% liquid. The feed is discharged from pipe outlet 38 and directed radially outward toward the tubular intermediate portion 10c of basket 10 by conical portion 20a of baseplate 20. The slurry can be fed at a rate so as to have a radial thickness of up to several inches at the upstream end portion of the basket 10. The slurry travels toward the downstream end portion of basket 10 due to centripetal and gravitational forces.

As the slurry descends along the interior wall of basket 10, the rotation and vibration of basket 10 stratifies the slurry with the highest specific gravity material (heavy fractions) being radially outward with respect to the lighter specific gravity material (lighter fractions). That is, hindered settling, differential acceleration and consolidation trickling cause the material to separate into layers of particles differing in specific gravity. The intermediate fractions (i.e., the fractions having a specific gravity between that of the heavy and light fractions) form a layer between the heavies and lights. The heavy fractions of the material pass transversely through openings 18 in basket 10 and descend toward first outlet 74 as generally designated by arrow 73a. As the concentration of the intermediate fractions increases, the weir member position is axially adjusted (i.e., it is moved in a direction generally parallel to the rotational axis of basket 10) to channel the intermediates intermittently or continuously from the downstream portion of basket 10 to second outlet 78 so that essentially only light fractions pass over weir member 42 and exit third outlet 80. The intermediate and light fraction flows are generally designated with arrows 73b and 73c, respectively. The intermediate layer in basket 10 advantageously forms a barrier that impedes the transverse flow of the lighter fractions through the basket with the heavy fractions.

As evident from the foregoing, weir member 42 may be adjusted between an open and closed position periodically, gradually over a period of time, or it may be spaced from the downstream portion of basket 10 to such a degree so as to provide a steady state flow of light fractions there over and toward outlet 80. Weir member 42 essentially acts as a valve for controlling the flow rate of the intermediates toward second outlet 74 so that essentially only light fractions pass over the weir member and flow toward outlet 80. That is, weir member 42 is opened to form channel 47 between the downstream end of basket 10 and the upstream portion of weir member 42 such that intermediate fractions can be propelled radially outward through channel 47, which is fluidly coupled to outlet 78, before passing over weir member 42.

Efficient operation of the separator 2 depends upon a number of variables which are adjusted according to the particular material being separated. The adjustment of the weir position depends on a number of variables as would be apparent to one of ordinary skill. Such variables include, but are not limited to, the feed material properties, the material feed rate, the water flow rate from water source 82, the distance between weir member 42 and the downstream edge 44 of basket 10, the degree of closure of control valve 76, the basket vibration frequency, the rotational speed of basket 10, and the size of openings 18 in basket 10. The flow rate of material and water, for example, must be set so that the water level $\alpha$ in the main hutch produces a desired flow rate over the weir member. The water flow rate from the water source 82 is particularly important since the flow rate over weir member 42 is directly affected by the water flow rate into the main hutch. If the water flow rate from the water source 82 is too high, the heavies may be carried over weir member 42 by the high flow rate. Conversely, if the flow rate is too low, the lights may report to the first or second outlets 74, 78 rather than third outlet 80. In order to maintain the water level $\alpha$ in the hutch 68 at the desired level when weir member 42 is opened, make up water may be added to hutch 68 from water source 82. Alternatively, water may be added to the slurry or the slurry flow rate may be increased.

In the illustrated embodiments of the present invention, the rotational axis of basket 10 is substantially parallel to the horizontal, thereby providing a horizontal centrifugal jig. If for some reason basket 10 is arrested when the process is in midstream, this arrangement provides for simpler feed removal from basket 10 during shut down than when the separator is arranged to have the rotational axis of the basket substantially parallel to the vertical.

Figure 6:
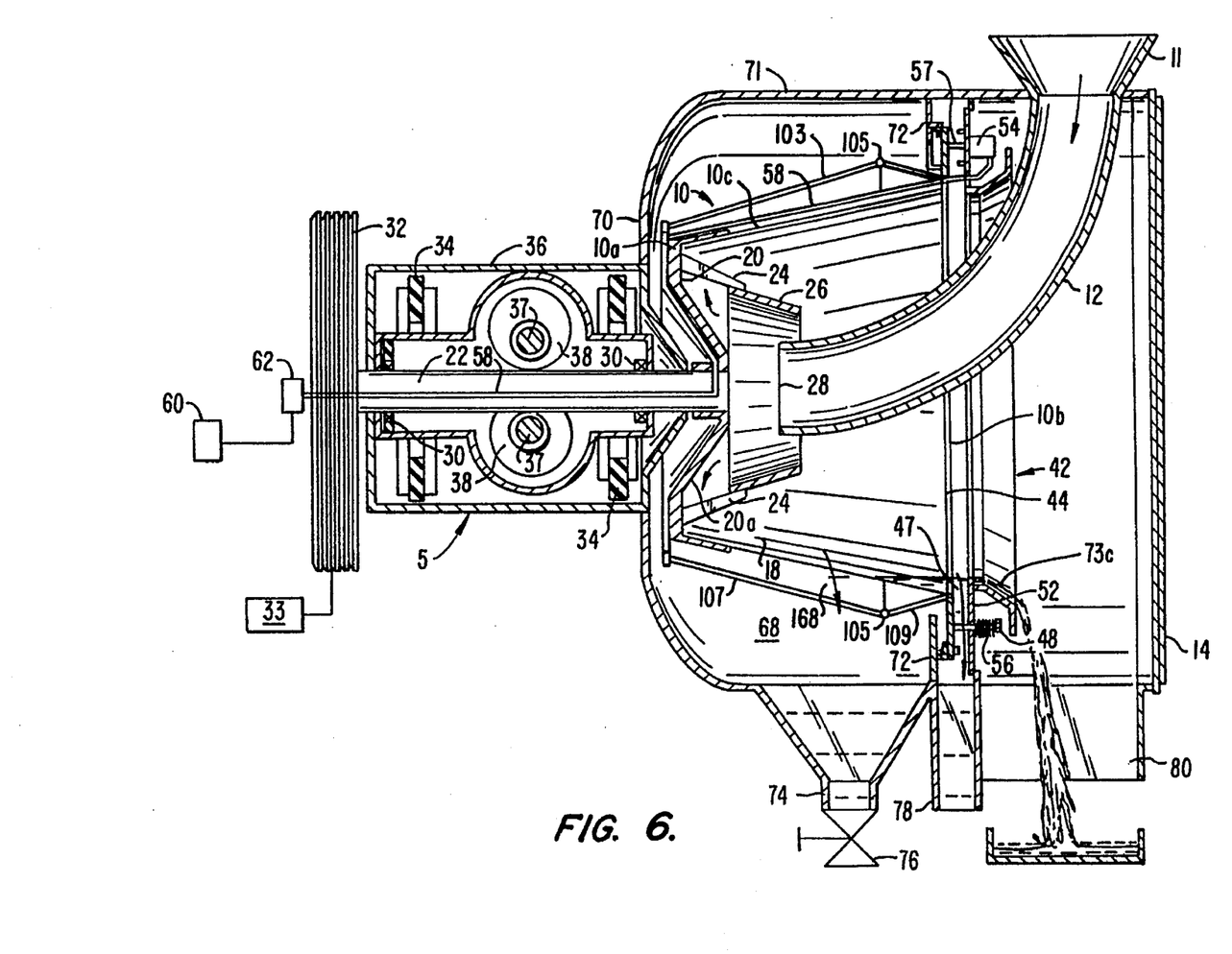
FIG. 6 is a longitudinal section of a further embodiment of the present invention.

Referring to FIG. 6, a further embodiment of the present invention is shown. Separator 102 differs from the separator 2 in that separator 102 includes an annular enclosure 103 that surrounds intermediate portion 10c and is secured to basket 10 to form hutch 168 therewith. Enclosure 103 is attached to basket 10 adjacent to upstream end portion 10a and downstream end portion 10b.

Enclosure 103 includes a plurality of nozzles or openings 105 for discharging material from hutch 168 to first outlet 74. An advantage of the hutch enclosure 103 is that a seal is not required to fluidly separate the hutch 168 and the second outlet 78. Nozzles 105 can be placed in any position relative to the upstream and downstream end of the basket, but are preferably positioned closer to the downstream end. Nozzles having a ½ to ¾ inch diameter are suitable, for example. Alternatively, other mechanisms such as elongate slots or circumferentially extending openings can be used to discharge material from enclosure 103 to first outlet 74.

Referring to FIG. 6, the hutch enclosure 103 has a first section 107 extending between the upstream end portion 10a and nozzles 105 and a second section 109 extending between nozzles 105 and the downstream inner peripheral edge 44 of basket rim 45. Although a hutch enclosure 103 is shown with two frustum shaped sections, other configurations can be used.

The configuration of separator 102 is particularly advantageous when separating liquid/liquid suspensions, such as when processing coal slurry fuels, crude oils, environmental remediation and clean-up, toxic liquids or colloidal suspensions. When separating a liquid/liquid suspension, the suspension is discharged from outlet 28 toward baseplate 20. The suspension then is directed radially outward toward the inner wall of basket 10.

As the basket is rotated and vibrated, the suspension flows toward downstream end portion 10b and is stratified such that the specific gravity of the fluids increases as one proceeds radially outward from the basket centerline. The heavy liquid(s) transversely passes through the openings in basket 10 and, then, passes through enclosure nozzles 105 at a controlled rate that is determined by the rotational speed of the basket and the size of the nozzles, both of which are selected according to the properties of the suspension as would be apparent to one of skill. In this manner, the heavy liquid(s) are withdrawn at a controlled rate allowing for complete disengagement of the light and heavy phases. Weir member 42 is positioned to permit the light liquid phases to pass there over, while allowing solids present in the liquids together with some of the light liquid(s) to be withdrawn down channel 47, which is formed between weir member 42 and the wall formed by rim 45 and its extension flange 50. That is, the solids which cannot pass through openings 18 in the screen deck are withdrawn through second outlet 78 with some of the light liquid(s) so that light liquid(s) passing over the weir member 42 contains a minimal amount of suspended solids.

Figure 7A:
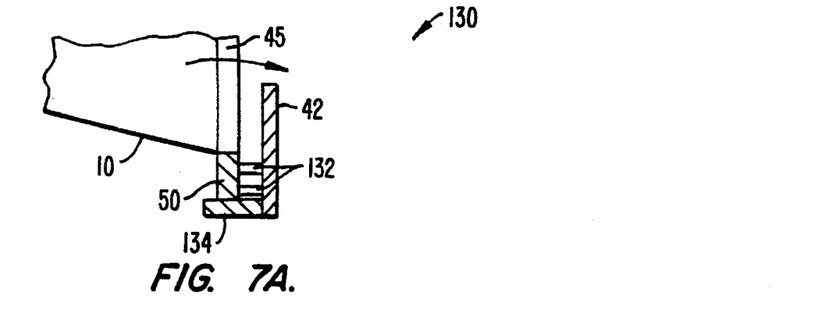
FIGS. 7A and B diagrammatically show another embodiment of the invention where the weir member is fixed and used in combination with a movable gate.
Figure 7B:
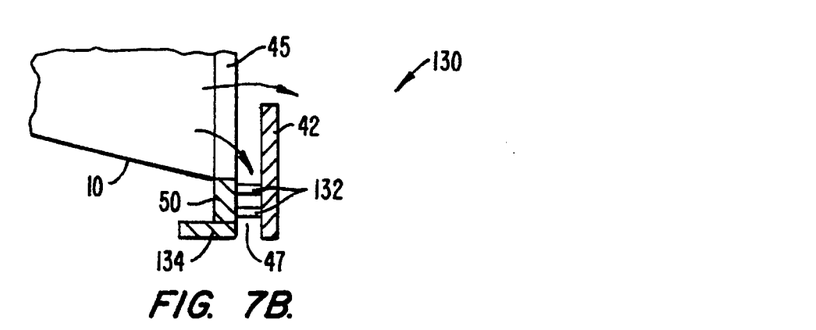
Figure 8A:
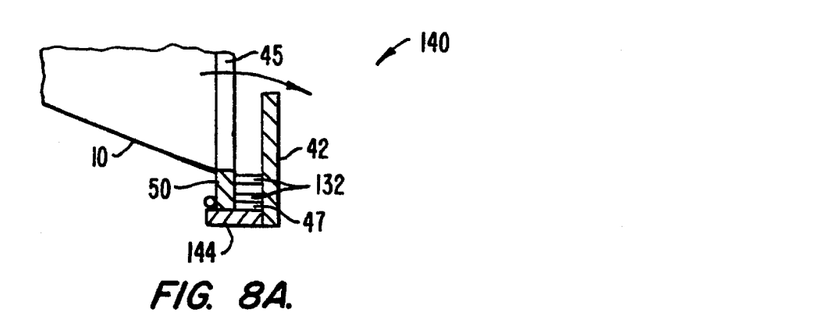
FIGS. 8A and B diagrammatically show yet another embodiment of the invention where the weir member is fixed and used in combination with a movable gate.
Figure 8B:
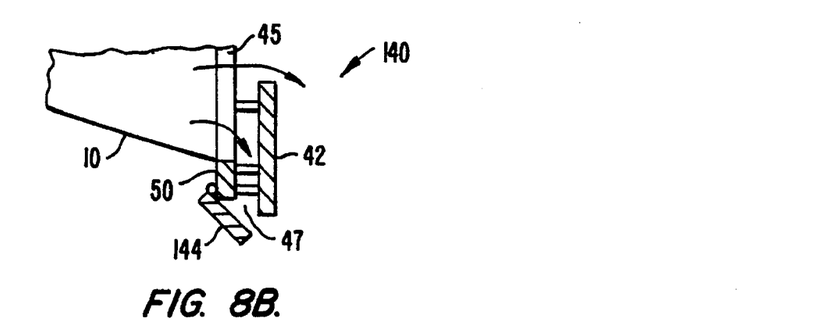

Referring to FIGS. 7A, B and 8A, B, alternate weir assemblies are diagrammatically shown. That is, weir assemblies 130 and 140 can be substituted for the axially movable weir member arrangement illustrated in FIGS. 1–6. Weir assembly 130 includes weir member 42 which is secured to and fixed in a position axially spaced from flange 50 via fastening elements 132. Fastening elements 132 are configured so as not to significantly obstruct channel annular 47. Annular weir gate 134 is axially moved or slid from its closed position (FIG. 7A) to an open position (FIG. 7B) to fluidly couple channel 47 with second outlet 78 (FIGS. 3 and 6) when withdrawal of intermediate fractions is desired as discussed above. The degree of withdrawal can be controlled by controlling the extent to which gate 134 is moved and the downstream end of channel 47 opened or closed. The position of gate 134 can be controlled by any conventional means. Gate 134 preferably is slidably mounted to flange 50 or weir member 42 so that gate 134 can slide toward and away from weir member 42 as shown in FIGS. 7A and B. A conventional motor and transmission can be used to move gate 134 along that path as would be apparent to one of ordinary skill.

Weir assembly 140 is the same as weir assembly 130, except that weir gate 144 is substituted for weir gate 134. Weir gate 144 comprises a multitude of sections that are arranged 360° around flange 50. Each section is hinged to flange 50 so that it can be moved from a closed position (FIG. 8A) to an open position (FIG. 8B) by conventional means. Each section can be biased to the closed position by spring mechanisms, for example.

Control box 96 houses the various controls to actuate basket rotation, the hydraulics, water addition and so forth as is conventional in the art. A computer controlled feed-back system also can be provided to control the various operating parameters. The control system may be used to control the flow rate of water from the water source 82, the position of weir member 42, control valve 76 and the rotational speed and vibration of basket 10, for example, in real time. The various material flows may also be automatically monitored with the measurements being reported to the control system so that the operating parameters can be adjusted accordingly.

Figure 9:
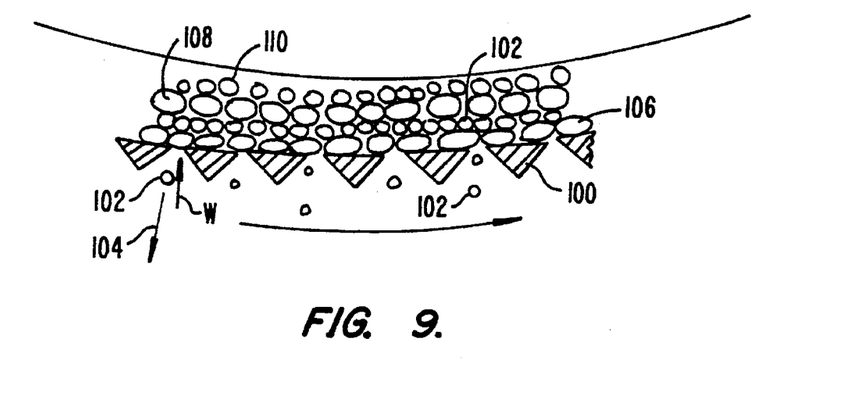
FIG. 9 is a profile of wire attached to the basket for forming the rotating deck of the basket; and, FIG. 10 is a process schematic of the separator of this invention.

Referring to FIG. 9, an the deck of the bed is illustrated in section. Several observations can be made.

First, a possible deck bed construction is illustrated. A preferred embodiment for the deck bed includes triangular wire 100 laid in side-by-side relation. Spatial separation between the respective wire strands 100 is chosen to a dimension that allows heavy fine particles 102 to pass downward as at 104. Such passage occurs interior of the housing (not shown in this view).

Second, assuming that this segment of the bed is undergoing classification, the various particle layers can be understood. Heavy fine particles 102 are adjacent wires 100 and have sufficient dimension that passage between wires 102 occurs. Large heavy particles 106 form a bed overlying wires 100 having heavy fine particles 102 passing (periodically) through large heavy particles 106. It should be noted that those heavy fine particles 102 passing through large heavy particles 106 do so under the forces of consolidation trickling.

Next large light particles 108 layer over heavy fine particles 102 and themselves carry light fine particles 110 as the top layer. It will be remembered that large heavy particles 106 in effect form a "ragging bed" for large light particles 108 and fine light particles 110.

Third, and finally, it will be seen that water W flows from the outside of the deck formed by wires 100 to the inside. Such movement is counter to the flow of heavy fine particles 102.

Figure 10:
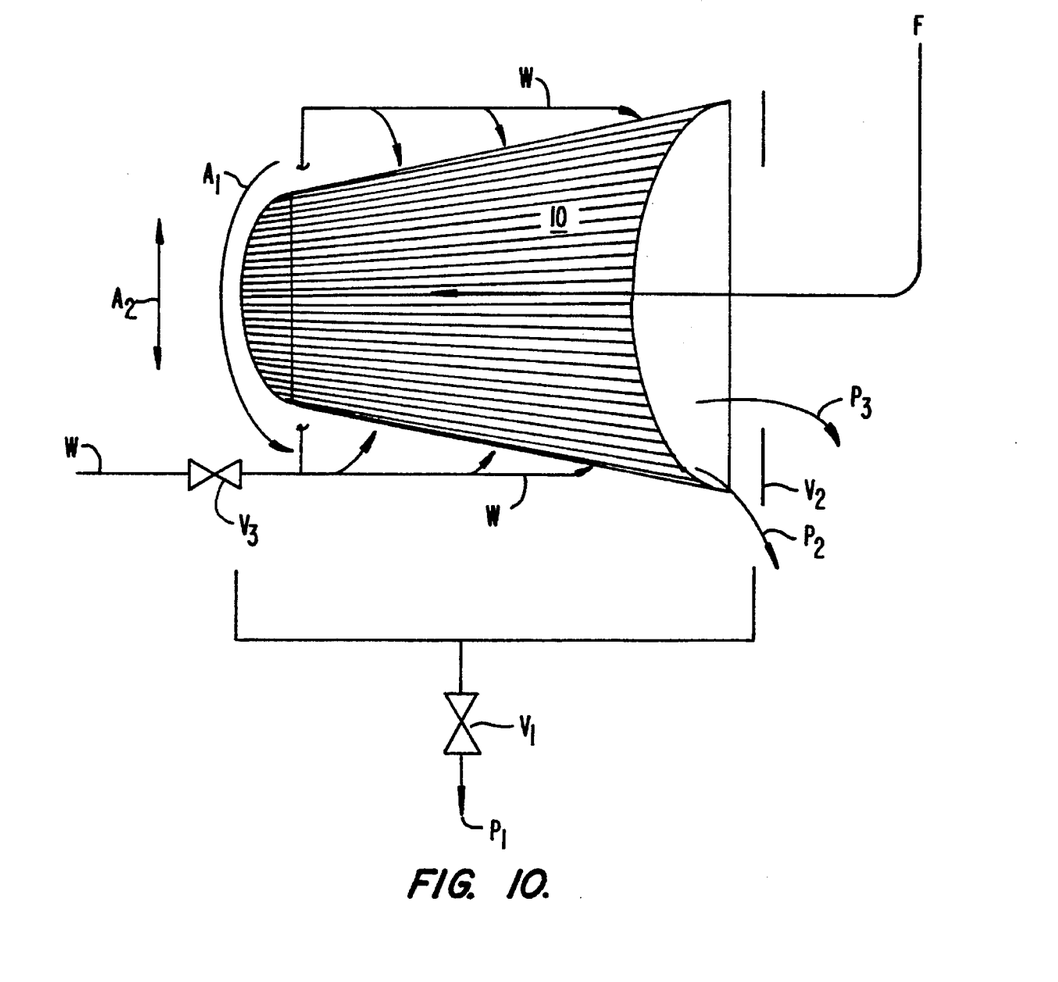

Referring to FIG. 10, the separation process of this invention is diagrammatically illustrated. Basket 10 is shown with the housing omitted. Materials to be separated or stream of solids F flows interior of the housing. It is the purpose of the separator to receive slurry F of mixed particles and to separate to product $P_1$ (for example heavy fine particles passing through the basket), product $P_2$ (for example heavy large particles passing between weir 42 and basket 10) and product $P_3$ (for example light fine particles passing over weir 42).

This particle separation will occur utilizing rotation or centripetal force $A_1$, vibration $A_2$ normal to the spin axis of basket 10 and the flow of water W through the basket. It is important to remember that the flow of water W will be opposite to particle flow $P_1$ through basket 10. Heavy fine particle flow $P_1$ will be from the inside of the basket to the outside of the basket; water W flow will be from the outside of the basket to the inside of the basket.

It will be thus understood that a stream of solids in the slurry F is separated into products $P_1$, $P_2$, and $P_3$ based on the response of these products $P_1$, $P_2$, and $P_3$ to each other; the relative volume abundance of products $P_1$, $P_2$, and $P_3$ in discrete size intervals; the rotational force $A_1$, the oscillation or jigging force $A_2$ as balanced by the addition of water or fluid W regulated at valve $V_3$; and, the extraction of product $P_1$ and $P_2$ as controlled by valves $V_1$ and $V_2$ respectively.

By the proper balance of rotational force $A_1$ with jigging force $A_2$ and flow W as regulated by valve $V_3$ and modulated by the control of product $P_1$ and $P_2$ by valves $V_1$ and $V_2$ respectively, centrifugation, buoyant support, elutriation, differential acceleration, hindered settling, consolidation trickling and ragging separation all simultaneously occur.

It will thus be understood that the process of this invention includes the ability to mechanically separate fractions that could not be separated before. For example, particle separation can occur where the density difference between the respective particles is 1.5%.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A material separator comprising:

a housing;

a basket rotatably mounted in the housing, the basket having an upstream end portion, a downstream open end portion and a tubular portion disposed therebetween, the tubular portion including a screen;

a drive coupled to the basket for rotating the basket in the housing;

a feed line having an inlet adapted for coupling to a source of material and an outlet arranged to the tubular portion of the basket for delivering material from the source of material to the tubular portion;

a circular weir member having a body for damming the downstream open end portion and having a top for permitting fluid to flow thereover;

means for moving the circular weir member between a first position where the circular weir member dams the downstream open end portion and a second position where the circular weir member is spaced from the downstream open end portion to permit material to pass between the circular weir member and the downstream open end portion of the basket;

a first, second and third fluid paths for discharge of materials that are in fluid communication with the basket;

the first fluid path passing through the tubular screen of the rotating basket and into the housing and out a first outlet;

the second fluid path passing between the circular weir member and the basket when the circular weir member is in the second position to a second outlet; and, the third fluid path passing over the top of the circular weir member to a third outlet.

2. The separator of claim 1 further including an actuator coupled to the circular weir member for moving the circular weir member from the first position to the second position.

3. The separator of claim 2 further including a spring actuator coupled to the circular weir member for biasing the circular weir member toward the first position.

4. The separator of claim 1 further including a vibrator coupled to the basket for vibrating the basket.

5. The separator of claim 1 further including a seal between the basket and the first and second fluid paths.

6. The separator of claim 5 further including a control valve mounted to the housing and fluidly coupled to the first fluid path.

7. The separator of claim 1 wherein the housing includes a water inlet on the interior of the housing exterior of the basket.

8. The separator of claim 7 further including an enclosure that surrounds the basket, the enclosure including a plurality of openings, the openings being fluidly coupled to the first outlet.

9. The separator of claim 1 further including a line having an inlet adapted for coupling to a source of hutch fluid and an outlet positioned in the housing for delivering hutch fluid to the basket.

10. The separator of claim 1 wherein the tubular portion is substantially frustum shaped.

11. A material separator comprising:

a housing;

a basket rotatably mounted in the housing, the basket with an interior and an exterior, the basket further having an upstream end portion, a downstream open end portion and a tubular portion disposed therebetween, the tubular portion including a screen;

a drive coupled to the basket for rotating the basket in the housing about a rotation axis;

a vibrator coupled to the basket for oscillating the basket;

a feed line having an inlet adapted for coupling to a source of material and an outlet arranged to the tubular portion of the basket for delivering material from the source of material to the tubular portion;

a circular weir member having a body for damming the downstream open end portion and having a top for permitting fluid to flow thereover;

means for moving the circular weir member between a first position where the circular weir member dams the downstream open end portion and a second position where the circular weir member is spaced from the downstream open end portion to permit material to pass between the circular weir member and the downstream open end portion of the basket;

a first, second and third fluid paths for discharge of materials that are in fluid communication with the basket;

the first fluid path passing through the tubular screen of the rotating basket and into the housing and out a first outlet;

the second fluid path passing between the circular weir member and the basket when the circular weir member is in the second position to a second outlet; and, the third fluid path passing over the top of the circular weir member to a third outlet.

12. The vibrating separator of claim 11 and further including:

means for flooding the housing with fluid to produce fluid flow from the exterior of the basket to the interior of the basket during rotation of the basket.

13. The vibrating separator of claim 11 and further including:

the vibrator coupled to the basket vibrates the basket normal to the rotation axis of the basket.

14. The vibrating separator of claim 11 and further including:

the vibrator coupled to the basket vibrates the basket from a position proximate the center of gravity of the separator.

* * * * *